United States Patent [19]

Sakon et al.

[11] Patent Number: 5,041,490

[45] Date of Patent: * Aug. 20, 1991

[54] METHOD FOR PRODUCING RED PHOSPHORUS FLAME RETARDANT AND NONFLAMMABLE RESINOUS COMPOSITION

[75] Inventors: Ichiro Sakon, Toyama; Masao Sekiguchi, Uozu; Atsushi Kanayama, Toyama, all of Japan

[73] Assignee: Rinkagaku Kogyo Co., Ltd., Toyama, Japan

[ * ] Notice: The portion of the term of this patent subsequent to Nov. 7, 2006 has been disclaimed.

[21] Appl. No.: 437,762

[22] Filed: Nov. 15, 1989

Related U.S. Application Data

[63] Continuation of Ser. No. 204,191, Jun. 8, 1988, abandoned.

[30] Foreign Application Priority Data

Jun. 26, 1987 [JP] Japan ................... 62-160715
Oct. 17, 1987 [JP] Japan ................... 62-261252

[51] Int. Cl.$^5$ ................... C08K 3/32; C08K 9/00
[52] U.S. Cl. ................... 524/414; 524/80; 523/205; 523/206; 423/322; 252/601; 252/602; 252/609
[58] Field of Search ........... 524/80, 414; 523/205, 523/206; 423/322; 260/DIG. 24; 252/609, 601, 602

[56] References Cited

U.S. PATENT DOCUMENTS

| | | |
|---|---|---|
| 3,931,081 | 4/1976 | Dany et al. |
| 3,963,669 | 3/1976 | Wurmb et al. |
| 4,067,897 | 12/1978 | Ducloux |
| 4,071,584 | 5/1978 | Birum |
| 4,092,460 | 9/1978 | Cerny et al. |
| 4,315,897 | 3/1982 | Staendeke et al. |
| 4,421,728 | 6/1983 | Twardowska |
| 4,440,880 | 9/1984 | Albanesi et al. |
| 4,698,215 | 10/1987 | Albanesi et al. |
| 4,879,067 | 11/1989 | Sakon et al. ........... 523/205 |

FOREIGN PATENT DOCUMENTS

0249723 12/1987 European Pat. Off.
54-39200 4/1979 Japan.
55-10462 7/1980 Japan.

OTHER PUBLICATIONS

Hawley, 1981, The Condensed Chemical Dictionary—Tenth Edition, Van Nostrand Reinhold Co., New York, p. 810.

*Primary Examiner*—Kriellion S. Morgan
*Attorney, Agent, or Firm*—Flynn, Thiel, Boutell & Tanis

[57] ABSTRACT

Red phosphorus flame retardants for synthetic resin are produced by a method comprising the steps of heating yellow phosphorus at temperatures of 250° to 600° C. to effect a partial conversion of yellow phosphorus to red phosphorus; removing unconverted yellow phosphorus; and coating particles of the resulting red phosphorus with at least one of thermosetting resin and metal hydroxide. The thus obtained red phosphorus flame retardants are very stable because of significantly improved heat resistance, water resistance and weatherability and thus can provide nonflammable resinous compositions which can be used for long period of time. The nonflammable composition consists essentially of 100 parts by weight of polyolefine resin, 20 to 200 parts by weight of hydrated inorganic filler and 0.1 to 30 parts by weight of the coated red phosphorus flame retardant.

12 Claims, No Drawings

METHOD FOR PRODUCING RED PHOSPHORUS FLAME RETARDANT AND NONFLAMMABLE RESINOUS COMPOSITION

This application is a continuation of U.S. Ser. No. 07/204 191, filed June 8, 1988 now abandoned.

BACKGROUND OF THE INVENTION

1. Field of the Invention

The present invention relates to a method for producing a red phosphorus flame retardant, especially, a highly stabilized red phosphorus flame retardant, and to a nonflammable resinous composition containing the flame retardant.

2. Description of the Prior Art

Red phosphorus has been well known as a flame retardant for synthetic resin and has been incorporated into various resins. However, commercially available red phosphorus has hardly been used as it is. In most cases, special stabilizing treatments are required. This is mainly due to the following reasons. Namely, since red phosphorus is unstable to heat, friction, shock, etc., accidents are apt to occur during the storage and handling and incorporation of it into synthetic resin. Further, red phosphorus reacts with moisture and oxygen in the air, thereby forming toxic and harmful substances. Such desirable properties of red phosphorus do not permit its safe use as a flame retardant. Further, red phosphorus does not have a good compatibility with synthetic resin. For these reasons, red phosphorus is usually coated with an inorganic or organic material. However, in recent years, as physical properties required for synthetic resins are increasingly severe, more highly stabilized flame retardants of red phosphorus have been demanded. For example, polyolefine resins have been used as covering materials for communication cables, electric cables, etc. In such uses, serious accidents have been experienced due to fires of the cables. Therefore, a countermeasure has been urgently needed against such accidents and, at the same time, higher levels of nonflammability are required in the covering resin materials.

Conventionally, for example, polyvinyl chloride and halogen-containing polyolefine have chiefly been used as nonflammable covering resin materials. However, these halogen-containing polymers have great difficulties to ensure safety and prevent accidents, since they cause problems such as evolution of large quantities of smoke and gas, which are highly toxic and corrosive, during a fire. As means for eliminating these difficulties, it has been proposed to add a smoke inhibitor, an acid trapping filler, etc. However, these additives have to be added in large amounts to fully prevent the smoking and gas evolution and, thereby, the nonflammability inherent in the foregoing polymers may be considerably impaired. Therefore, under the existing circumstances, the halogen-containing polymers can not meet, at the same time, the requirements of reduction of smoking and environmental pollution and good nonflammability.

On the other hand, as a halogen-free nonflammable composition, there has been known a polyolefine composition prepared by incorporating a high-temperature active filler, such as magnesium hydroxide or aluminum hydroxide, which absorbs combustion heat, into polyolefine type resin. However, in the composition, these inorganic fillers are needed in large quantities in order to ensure a sufficient nonflammability, thereby causing an undesirable deterioration of the properties of the used resin, especially with respect to mechanical and electrical properties, heat resistance, water resistance and weatherability.

As previously described, red phosphorus has been well known to be an effective flame retardant for synthetic resin and has been used in practical applications related to electronics, etc.

However, red phosphorus is disadvantageous, for example, in that it forms phosphine and oxidized products with the lapse of time, thereby deteriorating the used resin. Therefore, currently, red phosphorus flame retardants composed of red phosphorus particles coated with a stabilizing agent have been mainly used. However, even the thus stabilized red phosphorus has only a very insufficient stability for a long-term use under variable environmental conditions, such as for example in cables, and, thus, can not provide good utility for such an actual use.

Nevertheless, there is still now a strong demand for further improvements in the stability of red phosphorus because of the several advantageous properties of red phosphorus. For example, when red phosphorus is used, evolution of smoke and toxic gases is very slight as compared with the foregoing chlorine-containing flame retardant. Since a considerably high flameproofing effect can be obtained with addition of small amounts of red phosphorus, addition of filler which may adversely affect the mechanical properties of resin can be avoided.

Under such circumstances, the present Inventors have considered that the known surface treatments for stabilizing have limitations and made many studies on stabilization of red phosphorus flame retardants from a quite different angle. As a result, it has been found that substantially spherical red phosphorus having entirely different surface state, physical properties and shape from any known red phosphorus can be obtained by a novel process unknown in the prior production processes of red phosphorus. Further, although the novel red phosphorus itself can be sufficiently used as a flame retardant because of its very high stability, it can be further highly stabilized by surface treating, and, thereby, exhibits significantly improved water resistance, corrosion resistance and heat resistance as compared with those of the red phosphorus flame retardant obtained in the prior art.

SUMMARY OF THE INVENTION

It is therefore an object of the present invention to provide a method for producing a red phosphorus flame retardant having improved stability and safety.

A further object of this invention is to provide a resinous nonflammable composition prepared by incorporating the red phosphorus into thermoplastic resin, especially, polyolefine resin, in which problems such as fire and environmental pollution are minimized and significantly improved heat resistance, water resistance and weatherability can be stably ensured over long periods of time.

In accordance to a first aspect of the present invention, a red phosphorus flame retardant is prepared by a method comprising the steps of:

heating yellow phosphorus at temperatures of 250° to 600° C. to effect a partial conversion of yellow phosphorus to red phosphorus;

removing unconverted yellow phosphorus; and coating particles of the resulting substantially spherical red phosphorus with at least one of thermosetting resin and metal hydroxide.

In a further aspect of the present invention, there is provided a nonflammable resinous composition containing the red phosphorus flame retardant prepared by the method specified above. The nonflammable composition consists essentially of 100 parts by weight of polyolefine resin, 20 to 200 parts by weight of hydrated inorganic filler and 0.1 to 30 parts by weight of the coated red phosphorus flame retardant.

DETAILED DESCRIPTION OF THE PREFERRED EMBODIMENTS

Red phosphorus has been produced by thermal conversion of yellow phosphorus. In the production process of red phosphorus heretofore employed, yellow phosphorus as a starting material is heated at a temperature near the boiling point of yellow phosphorus over a few days until the conversion reaction is completed, and red phosphorus is obtained in the form of a hard cake-like coagulated mass. When red phosphorus is incorporated as a flame retardant into synthetic resin, it must be in a powder form. Therefore, the prior art red phosphorus which is taken out of a conversion vessel as a coagulated mass indispensably requires a pulverizing step. In contrast to this, since conversion conditions according to the method of the present invention are different from those of the above conventional method, the resulting red phosphorus can be obtained in a powder form composed of substantially spherical fine particles and crumbly agglomerates thereof, and, thereby, does not require a pulverizing step.

In practicing the method of the present invention, yellow phosphorus as a raw material is charged into a reactor which has been previously filled with an inert gas and heated to melt and then conversion is commenced. The conversion is continued until the conversion of yellow phosphorus to red phosphorus reaches the desired conversion ratio and the conversion is stopped. After removing unconverted yellow phosphorus from the reactor by an appropriate technique, there can be obtained substantially spherical red phosphorus as a powder form. The present Inventors have unexpectedly found that the substantially spherical red phosphorus powder obtained by such a partial conversion has a considerably high stability as compared with the known pulverized red phosphorus. The present invention has been achieved based on this finding.

It has been found through the Inventors' extensive studies that conversion of yellow phosphorus to red phosphorus commences at a relatively low temperature and becomes rapid at about the boiling point of yellow phosphorus. Thereafter, the reaction rate further increases with an increase in temperature. In a low temperature range, red phosphorus is produced as fine spherical particles in molten yellow phosphorus. However, with increase in temperature, particles of red phosphorus agglomerate together and their particle size increases. The growth and agglomeration of the particles are also detected when the conversion is prolonged. Therefore, when the conversion reaction is carried out at a too high temperature or over a too long period of time, it excessively proceeds and most of the yellow phosphorus is converted to red phosphorus. In such conditions, the red phosphorus can no longer exist in the form of particles, forming an agglomerated product. Consequently, it is impossible to obtain red phosphorus in a powder state. Many efforts have been made by the present inventors in order to avoid the foregoing excessive conversion and thereby make possible the attainment of powdered red phosphorus composed of substantially spherical fine particles. It has been found that it is necessary to continue the conversion of yellow phosphorus to red phosphorus at 250° to 600 ° C. while maintaining the flow ability of the reaction mixture and the flowability of the reaction mixture can be maintained by controlling the conversion ratio to 70% or lower. The conversion ratio varies depending on the processing temperature and time. Lower processing temperature and shorter time will result in a lower conversion ratio. The conversion ratio can be arbitrarily adjusted by appropriately adjusting the processing temperature and time for the conversion. When the conversion ratio is controlled to 70% or lower, the reaction mixture is retained in a flowable state and red phosphorus can be obtained in a powder form after removing unconverted yellow phosphorus. When the temperature during the conversion procedure is below 250° C., the reaction rate is very small. Thus, such a lower temperature is unfavorable as a practical processing condition. While temperatures exceeding 600° C. result in an excessively high conversion rate and make difficult the control of the reaction. Further, the reaction mixture rapidly loses its flowability and a compact massive product results. Therefore, it is impossible to obtain powdered red phosphorus without a further pulverizing step, as described in the prior art process.

As set forth above, when the reaction temperature is low and the reaction time is short, the conversion ratio becomes small and the resulting red phosphorus powder has a small particle size. On the contrary, when the reaction time is long and the conversion ratio becomes large, the degree of agglomeration of red phosphorus particles is increased and the particle size becomes large. However, when the thus agglomerated particles are obtained from a flowable reaction mixture, the particles are, unlike a cake-like compact mass of red phosphorus, very loosely agglomerated and form a crumbly mass which can be readily crumbled to powder by a light mechanical treatment, without any treatment as called pulverizing. Inventors' experimental data showed that the stability of the agglomerated red phosphorus particles is not adversely affected by the dividing treatment as required for such a crumbly agglomerate and the red phosphorus powder which is obtained by dividing the particles agglomerated also exhibits a high stability. Therefore, the red phosphorus powder of the present invention may also contain the red phosphorus powder obtained by dividing such loosely agglomerated particles. The red phosphorus powder obtained according to the present invention and composed of substantially spherical particles has a particle size of the order of few microns to 100 $\mu$m and the particle size ranges in a narrow particle size distribution as compared with that of known pulverized red phosphorus powder and has a high uniformity.

In the present invention, conversion of yellow phosphorus to red phosphorus is performed by a partial conversion of yellow phosphorus and is quite different from a complete conversion heretofore practiced. Therefore, a removal process of unconverted yellow phosphorus is required and the process is readily performed using an appropriate technique, such as distillation, filtration or solvent extraction. Practically, distillation is carried out in an inert gas atmosphere under reduced pressure or ordinary pressure, after termination of the conversion reaction. Unconverted yellow phosphorus is removed by this distillation. When filtration is used, the reaction mixture is put into water or an aqueous solution and red phosphorus is separated from unconverted yellow phosphorus by filtration and dried. When solvent extraction is used, unconverted yellow phosphorus is extracted from the reaction mixture, using a solvent capable of dissolving yellow phosphorus. Needless to say, these techniques may be used in combination thereof. In any case, the removed yellow phosphorus may be recycled in a subsequent conversion process to red phosphorus. The red phosphorus obtained according to the process of the present invention itself has a high stability far superior to red phosphorus stabilized in the prior art. However, when the red phosphorus of the present invention is further surface-treated with at least one of thermosetting resin and metal hydroxide, such as aluminum hydroxide, zinc hydroxide, etc., the stability is surprisingly improved and problems due to deterioration of synthetic resin which may be caused due to addition of the red phosphorus can be almost eliminated. Almost complete water resistance and corrosion resistance can be achieved and heat resistance is considerably improved. Therefore, the red phosphorus of the present invention can be used as a flame retardant for thermoplastic resin with safety. Such unexpectedly high stability of the red phosphorus flame retardant of the present invention is considered to be due to the fact that the surface state of the red phosphorus powder of the present invention is considerably different from that of the prior art pulverized red phosphorus powder. When red phosphorus powder is, like the aforesaid prior art, obtained by pulverizing a hard agglomerated mass, the resulting powder has a complicated surface state having acute edges and sharply fractured faces. In contrast to this, since the red phosphorus powder obtained according to the present invention is not subjected to a pulverizing process, its surface is almost free of fractured faces and edge lines. It has been confirmed by electron microscopy that the red phosphorus powder of the present invention is composed of particles having naturally formed spherical surfaces and agglomerates thereof. The pulverized red phosphorus powder has many active sites on its surface and readily reacts with moisture and oxygen. On the contrary, the substantially spherical red phosphorus particles of the present invention are almost free of such active sites and the surface state thereof is extremely stable. Therefore, chemical reactions with moisture and oxygen hardly occur and, as a result, the moisture resistance and heat resistance are greatly improved. Further, in the surface-treating with thermosetting resin or metal hydroxide, it is difficult to uniformly and wholly coat the pulverized red phosphorus due to its surface state and some portions of the surface may be left without a coating. However, spherical red phosphorus of the present invention can be uniformly and entirely coated. This makes a great difference in its stability.

The surface treatment of the red phosphorus of the present invention by thermosetting resin or metal hydroxide may be performed in a conventional manner. Examples of suitable thermosetting resins includes formaldehyde type resins, such as phenol-formaldehyde resin, urea-formaldehyde resin, melamine-formaldehyde resin furfuryl alcohol-formaldehyde resin, aniline-formaldehyde resin, etc.; and polyhydric alcohol-polybasic acid resins.

In practicing the present invention, 10 to 100 parts by weight of the red phosphorus is suspended in 100 parts by weight of water to give a suspension of red phosphorus. To the resulting suspension, a raw material or initial condensation product for the thermosetting resin is added in amounts of 1 to 35 parts by weight with respect to 100 parts by weight of the red phosphorus and stirred at 40° to 100 ° C. for 1 to 3 hours. If necessary, polymerization catalyst and filler such as aluminum hydroxide, magnesium hydroxide or titanium hydroxide may be present in the suspension. The addition of the filler not only improves the mechanical strength of the resulting resin coating but also provides a beneficial effect of shielding the purplish red color inherent to red phosphorus, thereby making possible a greatly expanded use of the red phosphorus flame retardant of the present invention.

When the red phosphorus is coated with metal hydroxide, for example, aluminum hydroxide or zinc hydroxide, an aqueous solution of sulfate or chloride of aluminum or zinc is added to an aqueous suspension of red phosphorus and aluminum hydroxide or zinc hydroxide is precipitated onto the red phosphorus powder, for example, by neutralization with sodium hydroxide or double decomposition by ammonium bicarbonate. The aqueous suspension of the red phosphorus preferably consists of 10 to 100 parts by weight of the red phosphorus and 100 parts by weight of water and the concentration of the aqueous solution of the metal salt may be preferably 5 to 30%. The quantity of the resulting metal hydroxide coating is preferably in the range of 1 to 30 parts by weight per 100 parts by weight of the red phosphorus. When the coating with the metal hydroxide is followed by coating with the thermosetting resin, the resulting double-coated red phosphorus has the highest level of stability and, even in use in severe conditions, it is not subject to deterioration. Therefore, in resinous compositions flameproofed by such a highly stabilized red phosphorus flame retardant, deleterious effects due to the use of the red phosphorus flame retardant are scarcely observed over long periods of time. When the double-coating procedure is carried out, the quantity of the metal hydroxide coating may be in the range of 0.1 to 30 parts by weight per 100 parts by weight of the red phosphorus.

In the preparation of the nonflammable composition of the present invention, the red phosphorus flame retardant prepared by the method of the present invention is mixed in the proportion of 0.1 to 30 parts by weight with respect to 100 parts by weight of polyolefine resin. When the red phosphorus flame retardant is less than 0.1 parts by weight, a sufficient flameproofing effect can not be obtained. On the other hand, the use of the red phosphorus flame retardant exceeding 30 parts by weight unfavorably affects physical properties of the resin.

The polyolefine resin may be any resin which can be obtained using olefine type monomers as starting materials and, as such polyolefine resin, there may be mentioned polyolefine type homopolymers, copolymer or mixtures thereof, more specifically, polyethylene, polypropylene, ethylene-acrylate copolymer, ethylenevinyl acetate copolymer, polybutene, cross-linked polyethylene, cross-linked polypropylene, ethylenepropylene rubber, poly-4-methylpentene-1, ethylenebutene copolymer butylrubber, styrene-butadiene rubber and mixtures thereof. These resins are all free of halogen and can be effectively flameproofed by the red phosphorus of the present invention without deterioration of the mechanical and electrical properties. Therefore, the present invention can provide very useful nonflammable resinous compositions minimizing the problems of smoking and environmental pollution and having a superior combination of properties with respect to heat-resistance, water resistance and stability which insures a substantial long useful lie. The foregoing properties are especially important for insulating materials used for covering communication cables and other electric cables which are used in widely variable environmental conditions, especially, with regard to temperature and water. According to the present invention, the cable covering materials are first successfully flameproofed with red phosphorus flame retardant to practical levels. Resins flameproofed with the prior art red phosphorus flame retardant are inferior in heat resistance and water resistance and, thus, when they are used to cover the above-mentioned cables, they are readily deteriorated in a short period of time, thereby causing swelling, embrittlement, discoloring, etc. As a result, the mechanical properties and electrical properties of the covering materials are impaired and the cables become impractical from the standpoint of external appearance and safe use. However, in the resinous compositions flameproofed according to the present invention, their initial properties are stably retained over a long period of time even under severe conditions, such as heat, water, etc. This makes a great contribution to safe use and cost reduction in long-term use in applications related to the foregoing cables. Also, in other applications, there can be obtained considerable improvements in safe use and durability.

In the present invention, magnesium hydroxide, aluminum hydroxide, basic magnesium carbonate, etc., may be employed as a filler synergistically increasing the flameproofing effect of the red phosphorus. When the fillers are used in combination with the red phosphorus, they synergistically improve the flameproofing effect of the red phosphorus, achieving high flameproofing effect which can not be obtained when the red phosphorus is used alone. Although the red phosphorus itself causes the evolution of small amounts of smoke, the above filler has an effect of reducing the smoke evolution. The inorganic fillers are preferably added in the range of 20 to 200 parts by weight with respect to 100 parts by weight of polyolefine resin or modified polyolefine resin. Addition of less than 20 parts by weight can not achieve a sufficient synergistic effect in cooperation with the red phosphorus. On the other hand, when the addition exceeds 200 parts by weight, the physical properties of the resin are adversely affected. If necessary, additives such as dripping inhibitor (e.g., carbon black), lubricant, colorant, dispersant, etc., may be added to the nonflammable composition of the present invention.

Hereinafter, the present invention will now be described in detail with reference to the following examples. In the examples, the term "red phosphorus flame retardant" is used to mean "coated red phosphorus" and percentages are given by weight, unless otherwise specified.

Examples

EXAMPLE 1

A stream of nitrogen gas was passed through a stainless steel vessel to displace the air and 500 g of yellow phosphorus was charged into the vessel. After sealing the vessel, the yellow phosphorus was heated at 270° C. for four hours to effect conversion of yellow phosphorus to red phosphorus. Unconverted yellow phosphorus was removed from the vessel and there was obtained 211 g of red phosphorus in a flowable powder form having an average particle size of 50 μm. The resulting substantially spherical red phosphorus was suspended in 400 ml of water and 150 ml of a 10% aqueous solution of aluminum sulfate was added to the resulting suspension. Then, 50 ml of a 5% aqueous solution of sodium hydroxide was added dropwise to the suspension while sufficiently stirring and the resulting suspension was heated to 50° C. and held at this temperature for 30 minutes. The suspension was filtered, washed with water and dried. There was obtained 217 g of red phosphorus flame retardant.

EXAMPLE 2

A stream of nitrogen gas was passed through a high-pressure reactor to displace the air and 100 g of yellow phosphorus was charged into the reactor. After sealing the reactor, the yellow phosphorus was heated to 480° C. for 30 minutes, held at that temperature for 10 minutes and cooled in the air. Unconverted yellow phosphorus was removed from the reactor, and 68 g of red phosphorus was obtained in a powder form.

The resulting substantially spherical red phosphorus was sieved through a 100 mesh screen. Although 22 percent of the red phosphorus powder was not passed, the residual red phosphorus powder can be readily crumbled by fingers to entirely pass through a 100 mesh screen. Thereafter, the powder was suspended in 200 ml of water and 3 g of phenol and 6 g of 37% formalin were added to the resulting suspension. After heating the suspension to 80° C., 2 g of 85% phosphoric acid was added under stirring. After heating the suspension at 80° C. for one hour with stirring, the suspension was cooled in the air, filtered and dried. There was obtained 72 g of red phosphorus flame retardant.

EXAMPLE 3

A stream of nitrogen gas was passed through a reactor and 200 g of yellow phosphorus was charged into the reactor and heated at 280° C. for one and a half hours to cause conversion of yellow phosphorus to red phosphorus. Unconverted yellow phosphorus was removed from the reactor and 36 g of powdered red phosphorus having an average particle size of 28 μm was obtained.

The resulting substantially spherical red phosphorus was suspended in 100 ml of water. To the suspension, 8 ml of 8% aluminum sulfate was added and stirred. Then, 10 ml of a 15% aqueous solution of ammonium bicarbonate was added dropwise to the suspension and the suspension was heated at 60° C. for 10 minutes. After adding 2 g of phenol and 4 g of 37% formalin to the suspension, the suspension was heated to 80° C. and 1 g of 85% phosphoric acid was added under stirring. After stirring the suspension at 80° C. for one hour, the suspension was cooled in the air, filtered and dried.

There was obtained 39 g of red phosphorus flame retardant.

COMPARATIVE EXAMPLE 1

Pulverized red phosphorus was subjected to the same coating treatment as described in Example 1.

COMPARATIVE EXAMPLE 2

Pulverized red phosphorus was subjected to the same coating treatment as described in Example 2.

COMPARATIVE EXAMPLE 3

Pulverized red phosphorus was subjected to the same coating treatment as described in Example 3.

The uncoated red phosphorus obtained in Examples 1 to 3 were tested for the physical properties in comparison with pulverized red phosphorus set forth in Comparative Examples 1 to 3. The results are shown in Table 1.

Further, the stability of the red phosphorus flame retardants set forth in example and comparative examples was tested in accordance with the test procedures described below and the results are shown in Table 2.

TABLE 1

| Physical Properties of Red Phosphorus | | | |
|---|---|---|---|
| Red Phosphorus | Ignition Point (°C.) | Evolution of Phosphine (ppm) | Elution of $P_2O_5$ (mg) | Average Particle Size (μm) |
| Example No. | | | | |
| 1 | 345 | 0.1 | 31.5 | 50 |
| 2 | 341 | 0.1 | 30.7 | 80 |
| 3 | 340 | 0.2 | 32.4 | 28 |
| Pulverized Red Phosphorus | 291 | 225.3 | 213.1 | 100 |

TABLE 2

| Stability of Red Phosphorus Flame Retardant | | | |
|---|---|---|---|
| Flame Retardant | Ignition Point (°C.) | Evolution of Phosphine (ppm) | Elution of $P_2O_5$ (mg) |
| Example No. | | | |
| 1 | 348 | 0.0 | 5.3 |
| 2 | 355 | 0.0 | 5.6 |
| 3 | 357 | 0.0 | 3.8 |
| Comparative Example No. | | | |
| 1 | 295 | 76.3 | 121.2 |
| 2 | 321 | 1.4 | 67.8 |
| 3 | 329 | 1.2 | 62.9 |

Measurement Method

Ignition Point 1 g of each sample was placed in a 10 ml porcelain crucible, then put in an electric furnace and heated at a heating rate of 1° C./min to measure ignition point.

Evolution of phosphine 20 g of each sample was suspended in 40 ml of water contained in a 500 ml flask and was fully shaken. After sealing the flask, the sealed sample was allowed to stand for 24 hours and the amount of phosphine evolved in a space above the suspension was measured.

Elution of $P_2O_5$ 5 g of each sample was suspended in 100 ml of water, was allowed to stand for 100 hours at 121° C. at 2 atm. and filtered. The $P_2O_5$ content in the filtrate was measured.

EXAMPLES 4 TO 9

Resinous compositions were prepared as test samples in which the red phosphorus (uncoated) or the red phosphorus flame retardants (coated) set forth in Examples 1 to 3 and metal hydroxide were incorporated into polyolefine resin in the proportions shown in Table 3. In Examples 4 and 5, the red phosphorus (uncoated) obtained in Example 1 was used and in Examples 6 to 9, the red phosphorus flame retardants (coated) obtained in Examples 1, 2 and 3 were used.

Each test sample was tested for nonflammability, moisture absorption and tensile strength reduction and the results are given in Table 4.

Comparative Examples 4 to 9

Comparative resinous compositions were prepared as test samples in which the pulverized red phosphorus (uncoated) or the pulverized red phosphorus flame retardants (coated) set forth in Comparative Examples 1 to 3 and metal hydroxide were incorporated into polyolefine resin in the proportions shown in Table 3. In Comparative Examples 4 and 5, the pulverized red phosphorus (uncoated) was used and in Examples 6 to 9, the pulverized red phosphorus flame retardants (coated) obtained in Comparative Examples 1, 2 and 3 were used.

Each test sample was tested for nonflammability, water absorption and tensile strength reduction and the results are given in Table 4.

TABLE 3

| Mixing Proportion of Resinous Composition (part by weight) | | | | | | |
|---|---|---|---|---|---|---|
| | Examples | | | | | |
| Constituents | 4 | 5 | 6 | 7 | 8 | 9 |
| PE*1 | 100 | | | | | |
| PP*2 | | 100 | | | | |
| EPR*3 | | | 100 | | | |
| EEA*4 | | | | 100 | | |
| EEA*5 | | | | | 100 | |
| EVA*6 | | | | | | 100 |
| Aluminum Hydroxide | 50 | | | 20 | | |
| Magnesium Hydroxide | | 50 | 100 | | 80 | 80 |
| Red Phosphorus or Red Phosphorus Flame Retardant*7 | 30 (1) | 25 (1) | 20 (2) | 2 (3) | 5 (3) | 10 (1) |
| | Comparative Examples | | | | | |
| Constituents | 4 | 5 | 6 | 7 | 8 | 9 |
| PE*1 | 100 | | | | | |
| PP*2 | | 100 | | | | |
| EPR*3 | | | 100 | | | |
| EEA*4 | | | | 100 | | |
| EEA*5 | | | | | 100 | |
| EVA*6 | | | | | | 100 |
| Aluminum Hydroxide | 50 | | | 20 | | |
| Magnesium Hydroxide | | 50 | 100 | | 80 | 80 |
| Red Phosphorus or Red Phosphorus Flame Retardant*7 | 30 (1) | 25 (1) | 20 (2) | 2 (3) | 5 (3) | 10 (1) |

Remark:
*1 Polyethylene density 0.92
*2 Polypropylene density 0.91
*3 Ethylene-Propylene rubber
*4 Ethylene-Ethylacrylate copolymer containing 5% Acrylate
*5 Ethylene-Ethylacrylate copolymer containing 8% Acrylate
*6 Ethylene-Vinyl Acetate copolymer containing 10% Acetate
*7 Numbers indicated within ( ) are those of Examples or Comparative Examples.

TABLE 4

| | Physical Properties of Resinous Composition | | | |
|---|---|---|---|---|
| | Nonflamma- bility (UL 94) | Moisture Absorption (%) | Tensile Strength Reduction (%) | External Appearance |
| Example No. | | | | |
| 4 | V-O | 0.10 | 3.0 | Unchanged |
| 5 | V-O | 0.11 | 2.7 | Unchanged |
| 6 | V-O | 0.15 | 2.7 | Unchanged |
| 7 | V-O | 4.5 | 5.2 | Unchanged |
| 8 | V-O | 4.2 | 4.8 | Unchanged |
| 9 | V-O | 3.7 | 3.1 | Unchanged |
| Comparative Example No. | | | | |
| 4 | V-O | 2.1 | 38 | Swelling |
| 5 | V-O | 2.2 | 30 | Swelling |
| 6 | V-O | 3.8 | 32 | Swelling |
| 7 | V-O | 42.1 | 72 | Considerable Swelling |
| 8 | V-O | 58.5 | 70 | Considerable Swelling |
| 9 | V-O | 69.2 | 69 | Considerable Swelling |

Remark:
Nonflammability:

According to the Vertical Flame Method UL-94

Moisture Absorption

With respect to Examples 4 to 6 and Comparative Examples 4 to 6, each sample was immersed in water and left at 121° C. at 2 atm for 100 hours. The percentage of the increase in the weight of the sample was measured.

With respect to Examples 7 to 9 and Comparative Examples 7 to 9, each sample was immersed in hot water at 95° C. for 35 days and the percentage of the increase in the weight of the sample was measured.

Tensile Strength Reduction

Each sample was treated in hot water in the same manner as described in Moisture Absorption and the tensile strength of the thus treated sample was measured. The reduction is indicated by the percentages of the reduction in the tensile strength caused by this immersion in hot water to the tensile strength of the sample before immersion. Tensile strength was measured in accordance with ASTM-D638.

As is clear from the tables, the red phosphorus flame retardants prepared by the method of the present invention have a high ignition point, excellent stability to heat and a significantly improved water resistance in comparison with the conventional pulverized red phosphorus. Further, the red phosphorus flame retardants of the present invention are almost free from the formation of toxic phosphine and corrosive acidic substances due to the reaction with moisture. Therefore, the red phosphorus flame retardant of the present invention is very useful as a highly stable and safe flame retardant for thermoplastic resin.

What is claimed is:

1. A method for producing a red phosphorus flame retardant, said method comprising the steps of:
    heating yellow phosphorus at temperatures of 250° to 600° C. to effect a partial conversion of not higher than 70% of said yellow phosphorus to red phosphorus;
    removing the unconverted yellow phosphorus; and
    coating the resulting substantially spherical particles of red phosphorus with at least one of thermostetting resin and metal hydroxide, said particles of red phosphorus having been formed without being subjected to a pulverization procedure.

2. A nonflammable resinous composition consisting essentially of 100 parts by weight of polyolefine resin, 20 to 200 parts by weight of hydrated inorganic filler and 0.1 to 30 parts by weight of substantially spherical particles of red phosphorus flame retardant, said flame retardant being produced by heating yellow phosphorus at temperatures of 250° C. to 600° C. to effect a partial conversion of not higher than 70% of said yellow phosphorus to red phosphorus; removing the unconverted yellow phosphorus; and coating the resulting substantially spherical particles of red phosphorus with at least one of thermosetting resin and metal hydroxide, said particles of red phosphorus having been formed without being subjected to a pulverization procedure.

3. A method for producing a red phosphorus flame retardant, comprising the steps of:
    heating yellow phosphorus, in an inert atmosphere, at a temperature of from 250° to 600° C. effective to convert a part of said yellow phosphorus to red phosphorus and form a flowable dispersion of fine substantially spherical particles of red phosphorus having a particle size of up to about 100 μm and friable loose agglomerates thereof dispersed in a matrix of molten yellow phosphorus, until 70% or lower of said yellow phosphorus has been converted to red phosphorus; then removing unconverted yellow phosphorus from said flowable dispersion and recovering said substantially spherical particles of red phosphorus and agglomerates thereof, which particles are substantially spherical and have external surfaces substantially free of fracture faces and acute edge lines, said surfaces also being substantially free of active sites capable of reacting with moisture and oxygen so that the surfaces of said particles are stable, said particles having been formed without being subjected to a pulverization procedure;
    and uniformly and entirely coating said external surfaces of said particles with at least one coating material selected from the group consisting of thermosetting resins and metal hydroxides.

4. A method as claimed in claim 3 in which unconverted yellow phosphorus is removed from said dispersion by distilling off said unconverted yellow phosphorus.

5. A method as claimed in claim 3 in which the amount of said coating material on said red phosphorus particles is from 1 to 35 parts by weight of said coating material per 100 parts by weight of said red phosphorus particles.

6. A nonflammable resin composition consisting essentially of a blend of
    100 parts by weight of polyolefin resin,
    20 to 200 parts by weight of hydrated inorganic filler and 0.1 to 30 parts by weight of substantially spherical, coated red phosphorus flame retardant particles having a particle size of up to 100 μm and friable loose agglomerates of said particles, the external surfaces of said red phosphorus particles being substantially free of fracture faces and acute edge lines and being substantially free of active sites capable of reacting with moisture and oxygen so that the external surfaces of said particles are stable, said particles having been formed without being subjected to a pulverization procedure, said external surfaces of said particles being uniformly and entirely coated with at least one coating material selected from the group consisting of thermosetting resins and metal hydroxides.

7. A nonflammable resin composition as claimed in claim 6 in said coated particles contain from 1 to 30 parts by weight of said coating material per 100 parts by weight of said red phosphorus particles.

8. A nonflammable resin composition as claimed in claim 6 in which said red phosphorus particles are coated with both of a thermosetting resin and a metal hydroxide.

9. A nonflammable resin composition as claimed in claim 6 in which said coating material is a thermosetting resin selected from the group consisting of phenol-formaldehyde resin, urea-formaldehyde resin, melamine-formaldehyde resin, furfuryl alcohol-formaldehyde resin, aniline-formaldehyde resin and polyhydric alcohol-polybasic acid resins.

10. A nonflammable resin composition as claimed in claim 6 in which said coating material is aluminum hydroxide or zinc hydroxide.

11. A nonflammable resin composition as claimed in claim 6 in which said polyolefin resin is selected from the group consisting of polyethylene, polypropylene, ethylene-acrylate copolymer, ethylene-vinyl acetate copolymer, polybutene, cross-linked polyethylene, cross-linked polypropylene, ethylene-propylene rubber, poly-4-methylpentene-1, ethylene-butene copolymer butyl rubber, styrene-butadiene rubber and mixtures thereof.

12. A nonflammable resin composition as claimed in claim 6 in which said inorganic filler is selected from the group consisting of aluminum hydroxide, magnesium hydroxide and basic magnesium carbonate.

* * * * *